(12) United States Patent
Wright et al.

(10) Patent No.: US 12,645,016 B2
(45) Date of Patent: *Jun. 2, 2026

(54) PARABOLIC CASSEGRAIN-TYPE REFLECTOR FOR ABLATION LOADING

(71) Applicants:IonQ, Inc., College Park, MD (US); Duke University, Durham, NC (US)

(72) Inventors: Kenneth Wright, Berwyn Heights, MD (US); Jason Madjdi Amini, Takoma Park, MD (US); Jungsang Kim, Chapel Hill, NC (US)

(73) Assignees: IonQ, Inc., College Park, MD (US); Duke University, Durham, NC (US)

( * ) Notice: Subject to any disclaimer, the term of this patent is extended or adjusted under 35 U.S.C. 154(b) by 375 days.

This patent is subject to a terminal disclaimer.

(21) Appl. No.: 18/472,835

(22) Filed: Sep. 22, 2023

(65) Prior Publication Data

US 2024/0019614 A1 Jan. 18, 2024

Related U.S. Application Data

(63) Continuation of application No. 17/342,012, filed on Jun. 8, 2021, now Pat. No. 11,796,721.

(Continued)

(51) Int. Cl.
*G02B 5/10* (2006.01)
*G21K 5/00* (2006.01)

(52) U.S. Cl.
CPC ...... *G02B 5/10* (2013.01); *G21K 5/00* (2013.01)

(58) Field of Classification Search
CPC ........ G02B 5/10; G02B 19/0023; G21K 5/00; G06N 10/00
See application file for complete search history.

(56) References Cited

U.S. PATENT DOCUMENTS

| | | | | |
|---|---|---|---|---|
| 9,609,732 | B2 * | 3/2017 | Smith | G21K 5/00 |
| 2010/0090133 | A1 * | 4/2010 | Endo | H05G 2/00 |
| | | | | 250/493.1 |

(Continued)

FOREIGN PATENT DOCUMENTS

| | | |
|---|---|---|
| CN | 102455317 A | 5/2012 |
| JP | 2000-133859 A | 5/2000 |

(Continued)

OTHER PUBLICATIONS

Leibrandt et al., "Laser ablation loading of a surface-electrode ion trap", Physical Review A, 76, 055403, 2007, pp. 1-4.

(Continued)

*Primary Examiner* — David E Smith
*Assistant Examiner* — Christopher J Gassen
(74) *Attorney, Agent, or Firm* — ARENTFOX SCHIFF LLP

(57) ABSTRACT

Aspects of the present disclosure describe techniques for using a parabolic Cassegrain-type reflector for ablation. For example, a system for ablation loading of a trap is described that includes a reflector having a hole aligned with a loading aperture of the trap, and an atomic source positioned at a focal point of the reflector, where one or more laser beams are reflected from a reflective front side of the reflector and focused on a surface of the atomic source to produce an atomic plume, and the atomic plume once produced passing through the hole in the reflector and through a loading aperture of the trap for loading the trap. A method for ablation loading of a trap within a chamber in a trapped ion system is also described.

20 Claims, 6 Drawing Sheets

Related U.S. Application Data

(60) Provisional application No. 63/036,761, filed on Jun. 9, 2020.

(56) References Cited

U.S. PATENT DOCUMENTS

| | | | | |
|---|---|---|---|---|
| 2010/0091396 A1* | 4/2010 | Hutson | .................. | F21S 11/00 |
| | | | | 362/350 |
| 2019/0027355 A1 | 1/2019 | Kim et al. | | |
| 2019/0287782 A1 | 9/2019 | Vrijsen et al. | | |

FOREIGN PATENT DOCUMENTS

| | | | |
|---|---|---|---|
| WO | 2017102931 A1 | 6/2017 | |
| WO | 2019089088 A1 | 9/2019 | |
| WO | 2019246033 A1 | 12/2019 | |

OTHER PUBLICATIONS

Zimmermann et al., "Laser ablation loading of a radiofrequency ion trap", arXiv:1112.1664; DOI: 10.48550/arXiv.1112.1664, 2011, pp. 1-6.

Hendricks, et al., "An all optical ion-loading technique for scalable microtrap architectures", arXiv:0705.0109; DOI: 10.48550/arXiv. 0705.0109, 2007, pp. 1-8.

Fabre et al., "Determination of ions in individual fluid inclusions by laser ablation optical emission spectroscopy: development and applications to natural fluid inclusions", Journal of Analytical Atomic Spectrometry, vol. 14, 1999, pp. 913-922.

Behm et al., "Microscopic Laser Desorption/Postionization Fourier Transform Mass Spectrometry", Analytical Chemistry, vol. 68, No. 5, 1996, pp. 713-719.

* cited by examiner

100

170

125

120a

135

115

110

150

145

140

130

160

200

170

120b

127

135

115

110

150

145

140

130

160

300

170

135

115

110

145a                145b 140a                140b

130

160a        160b

400

600 —

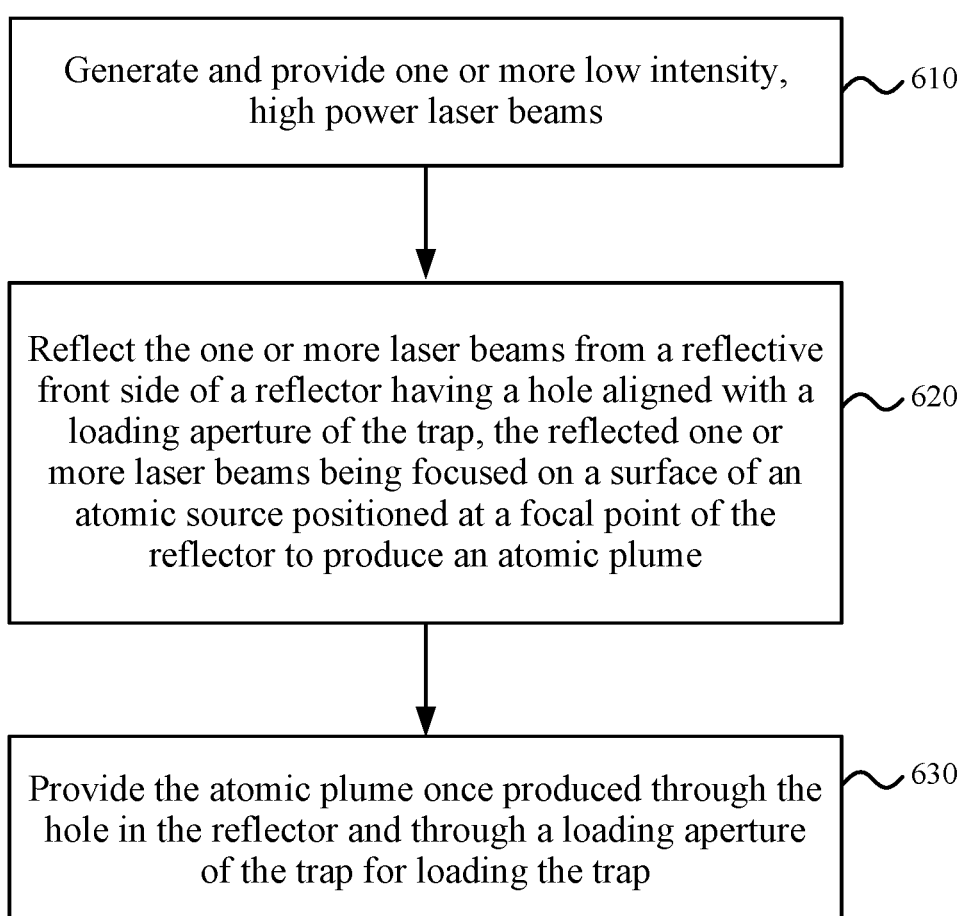

Generate and provide one or more low intensity, high power laser beams                    ~ 610

Reflect the one or more laser beams from a reflective front side of a reflector having a hole aligned with a loading aperture of the trap, the reflected one or more laser beams being focused on a surface of an atomic source positioned at a focal point of the reflector to produce an atomic plume                    ~ 620

Provide the atomic plume once produced through the hole in the reflector and through a loading aperture of the trap for loading the trap                    ~ 630

FIG. 6

PARABOLIC CASSEGRAIN-TYPE REFLECTOR FOR ABLATION LOADING

The current application is a continuation of U.S. patent application Ser. No. 17/342,012, filed Jun. 8, 2021, which claims priority to, and the benefit of, U.S. Provisional Application No. 63/036,761 filed on Jun. 9, 2020, entitled "PARABOLIC CASSEGRAIN-TYPE REFLECTOR FOR ABLATION LOADING," the contents of each of which are hereby incorporated by reference in their entireties.

BACKGROUND

Aspects of the present disclosure relate generally to ablation loading of an ion trap, and more specifically, to techniques for using parabolic reflectors for focusing a laser beam on an atom source for ablation load of the ion trap.

The process of trapping ions generally involves heating an atomic source to the point of sublimation. This generates an atomic flux which overlaps with the trapping potentials and laser cooling light that are applied to a trap. Ideally this is done behind an aperture such that atomic flux is not deposited on the trapping electrodes as this can lead to damage of the trap itself. The heating used to generate the atomic flux traditionally takes two basic forms: direct resistive heating from a current driven through mechanical pieces holding the atomic source, and ablation of the atomic source with a high intensity laser pulse.

Ablation loading requires focusing a high-power pulsed laser onto the atomic source. If light from this laser hits the trap, this can cause adverse heating of the trap, damage to the trap, and/or charging of the trap. Therefore, it is desirable to find a solution to loading using ablation that minimizes the amount of optical power dissipated at the trap.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

In an aspect of this disclosure, a system for ablation loading of a trap is described that includes a reflector having a hole aligned with a loading aperture of the trap, and an atomic source positioned at a focal point of the reflector, where one or more laser beams are reflected from a reflective front side of the reflector and focused on a surface of the atomic source to produce an atomic plume, and the atomic plume once produced passing through the hole in the reflector and through a loading aperture of the trap for loading the trap.

In another aspect of this disclosure, a method for ablation loading of a trap is described that includes generating and providing one or more low intensity, high power laser beams, reflecting the one or more laser beams from a reflective front side of a reflector having a hole aligned with a loading aperture of the trap, the reflected one or more laser beams being focused on a surface of an atomic source positioned at a focal point of the reflector to produce an atomic plume, and providing the atomic plume once produced through the hole in the reflector and through a loading aperture of the trap for loading the trap.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

FIG. 6 is a flow diagram that illustrates an example of a method in accordance with aspects of this disclosure.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form to avoid obscuring such concepts.

The present disclosure describes a technique for backside ablation loading of a trap (e.g., a surface trap). Here, the atomic flux from the ablation source travels from a source behind the trap, through a hole in the trap (the "loading slot") to the trapping region on the other side of the trap. The high-powered pulsed laser must hit the atomic source on a surface facing the trap and yet avoid hitting the trap itself.

To that end, the present disclosure proposes the use of a reflector (e.g., a reflective parabolic mirror) to focus the ablation laser beam onto an atomic source with the neutral flux passing through a hole in the reflector, where the atomic source is also positioned to block light from the laser beam from passing through the hole in the reflector. This configuration confines the high intensity light of the laser beam entirely to the atomic source and not on the trap. This also allows to bring in the ablation laser beam with relatively low intensity before focusing on the atomic source.

The configuration of the reflector being proposed in this disclosure is based on a Cassegrain reflecting system often used in optical telescopes and radio antennas that is a combination of a primary concave mirror with an entrance aperture (hole) and a secondary convex mirror. This design puts the focal point at a convenient location behind the primary mirror. In this disclosure, the reflector corresponds to the primary concave mirror of the Cassegrain reflecting system and the atomic source is positioned at the focal point of the reflector where the secondary convex mirror would be placed in the Cassegrain reflecting system.

Figure 1:
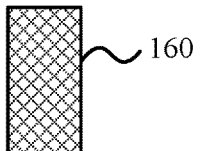
FIG. 1 illustrates a side view of a reflector used to focus an ablation laser beam onto an atomic source for backside loading of a trap in accordance with aspects of the disclosure.

FIG. 1 shows a diagram 100 that illustrates a side view of a reflector 110 used to focus an ablation laser beam 140 onto an atomic source 130 for backside loading of a trap 120a (e.g., an ion trap) in accordance with aspects of the disclosure. According to the diagram 100, an optical source 160 generates and provides the ablation laser beam 140, where the optical source 160 is aligned with the atomic source 130, a hole or aperture 115 of the reflector 110, and the trap 120a along a same axis 170. In one example, the hole 115 may be positioned at a center of the reflector 110, while in other examples, the hole 115 may be offset from the center of the reflector 110. The ablation laser beam 140 is provided as a high power, low intensity beam by the source 160. The ablation laser beam 140 is reflected from the reflector 110 to produce the reflected ablation laser beam 145 that is focused on a focal point of the reflector 110 where the atomic source 130 is positioned. The reflected ablation laser beam 145 is focused onto an ablation spot A on a surface of the atomic source 130.

The reflector 110 can be shaped to make it a reflective parabolic mirror, for example. The reflector 110 has a front side 150 (e.g., reflecting surface) that faces both the incoming ablation laser beam 140 and the atomic source 130. The ablation laser beam 140 reflects from the front side 150 and the reflected ablation laser beam 145 is focused on the surface of the atomic source 130. The reflected ablation laser beam 145 is a focused laser beam having both high power and high intensity at the focus. The position of the atomic source 130 is such that it blocks the ablation laser beam 140 from passing through the hole 115 and hitting the trap 120a. A back or back side of the reflector 110 faces the trap 120a.

The focusing of the reflected ablation laser beam 145 onto the surface of the atomic source 130 results in an atomic vapor plume 135 being produced and that passes through the hole 115 in the direction of the trap 120a. The atomic vapor plume 135 also passes through a trap loading aperture 125 on a back of the trap 120a to backside load the trap 120a with atomic species from the atomic vapor plume 135.

Figure 2:
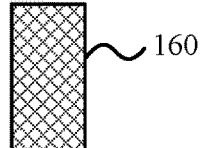
FIG. 2 illustrates a side view of a reflector used to focus an ablation laser beam onto an atomic source for side loading of a trap in accordance with aspects of the disclosure.

FIG. 2 shows a diagram 200 that illustrates a side view of the reflector 110 used to focus the ablation laser beam 140 onto the atomic source 130 for side loading of a trap 120b (e.g., an ion trap) in accordance with aspects of the disclosure. The diagram 200 in FIG. 2 is substantially similar to the diagram 100 in FIG. 1 with the difference being that the trap 120b is configured such that the atomic vapor plume 135 that is produced by ablation of the atomic source 130 passes through the hole 115 and through a trap loading aperture 127 on a side of the trap 120b to side load the trap 120b with atomic species from the atomic vapor plume 135. The trap loading aperture 127 may be a component with an aperture or hole that is integrated with the trap 120b or that is integrated with a structure holding or containing the trap 120b.

The traps described above in connection with FIGS. 1 and 2 may include surface electrode traps, macroscopic traps, or other types of traps for which ablation loading is a suitable form of loading atomic species to the trap.

Figure 3:
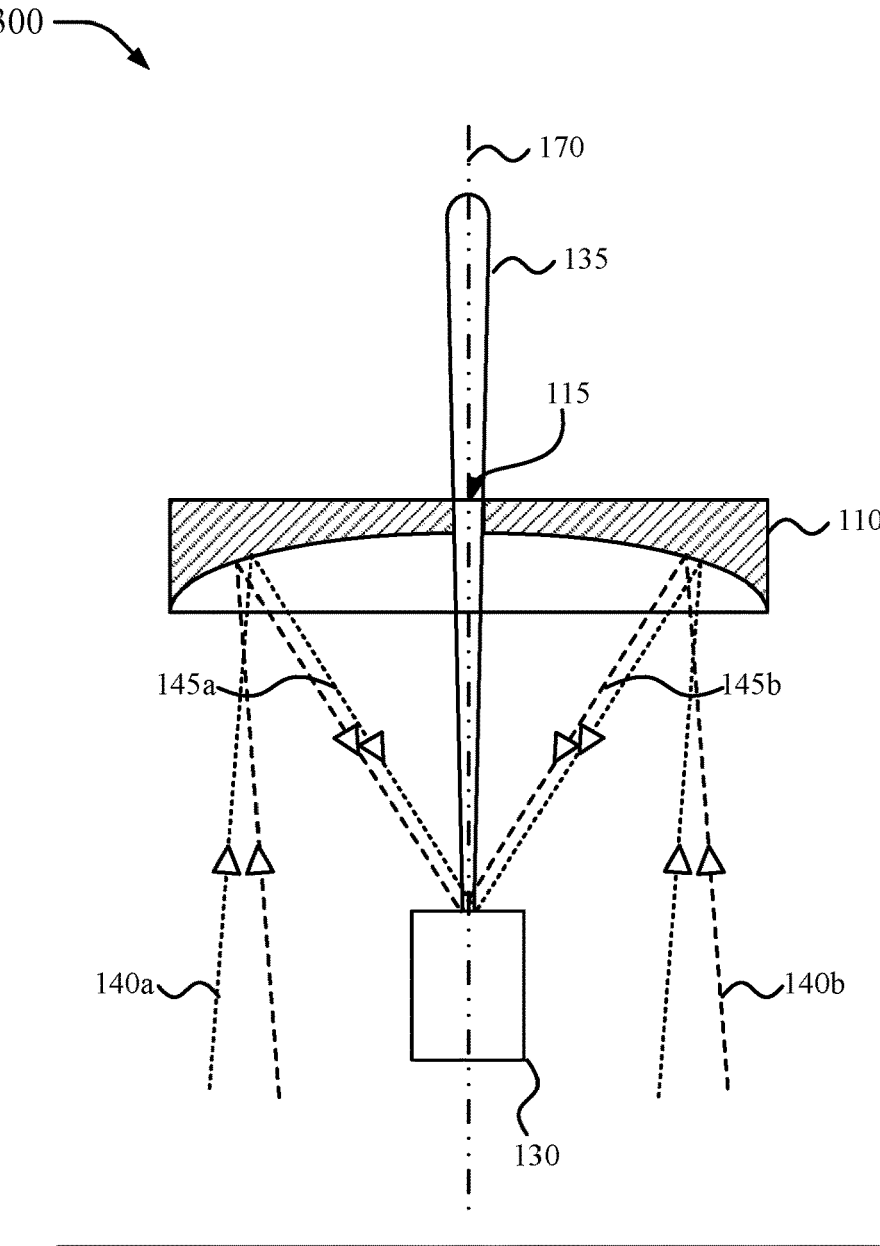
FIG. 3 illustrates a side view of a reflector used to focus one or more off-axis ablation laser beams onto an atomic source for loading of a trap in accordance with aspects of the disclosure.
Figure 3:

Referring now to FIG. 3, a diagram 300 is shown that illustrates a side view of the reflector 110 used to focus one or more off-axis ablation laser beams onto the atomic source 130 for loading (e.g., backside loading, side loading) of a trap (e.g., the trap 120a, the trap 120b) in accordance with aspects of the disclosure.

In the diagram 300, an optical source of an ablation laser beam, such as an optical source 160a or an optical source 160b, may be off-axis relative to the atomic source 130, the reflector 110, and a trap (not shown). The optical source 160a may generate and provide an off-axis ablation laser beam 140a, which is reflected by the reflector 110 to produce a reflected ablation laser beam 145a that is focused onto an ablation spot on the surface of the atomic source 130. The optical source 160a and/or 160b may be outside a chamber or some other compartment holding the atomic source 130 and/or the reflector 110. The off-axis ablation laser beam 140a may be received by the reflector 110 at a different angle than the on-axis ablation laser beam 140 in the diagrams 100 and 200. The reflected ablation laser beam 145a focused on the ablation spot produces the atomic vapor plume 135 that passes through the hole 115 in the reflector 110. The placement of the hole 115 and the shape of the atomic source 130 may be adjusted or configured to shield the hole 115 from the off-axis ablation laser beam 140a.

The optical source 160b may generate and provide from outside a chamber an off-axis ablation laser beam 140b, which is reflected by the reflector 110 to produce a reflected ablation laser beam 145b that is focused onto a different ablation spot on the surface of the atomic source 130. The off-axis ablation laser beam 140b may be received by the reflector 110 at a different angle than the on-axis ablation laser beam 140 in the diagrams 100 and 200 and the off-axis ablation laser beam 140a. The reflected ablation laser beam 145b focused on the ablation spot produces the atomic vapor plume 135 that passes through the hole 115 in the reflector 110. The placement of the hole 115 and the shape of the atomic source 130 may be adjusted to shield the hole 115 from the off-axis ablation laser beam 140b.

In some implementations, it may be possible to use two or more optical sources such as the sources 160a and 160b to enable off-axis ablation laser alignment to allow for multiple ablation spots on the one atomic source 130. In the example shown in the diagram 300, the optical source 160a (e.g., a first laser) may be used to produce a first ablation spot on the atomic source 130, and the optical source 160b (e.g., a second laser) may be used to produce a second ablation spot on the atomic source 130, where the first ablation spot and the second ablation spot occur at different positions on the surface of the atomic source 130.

Figure 4:
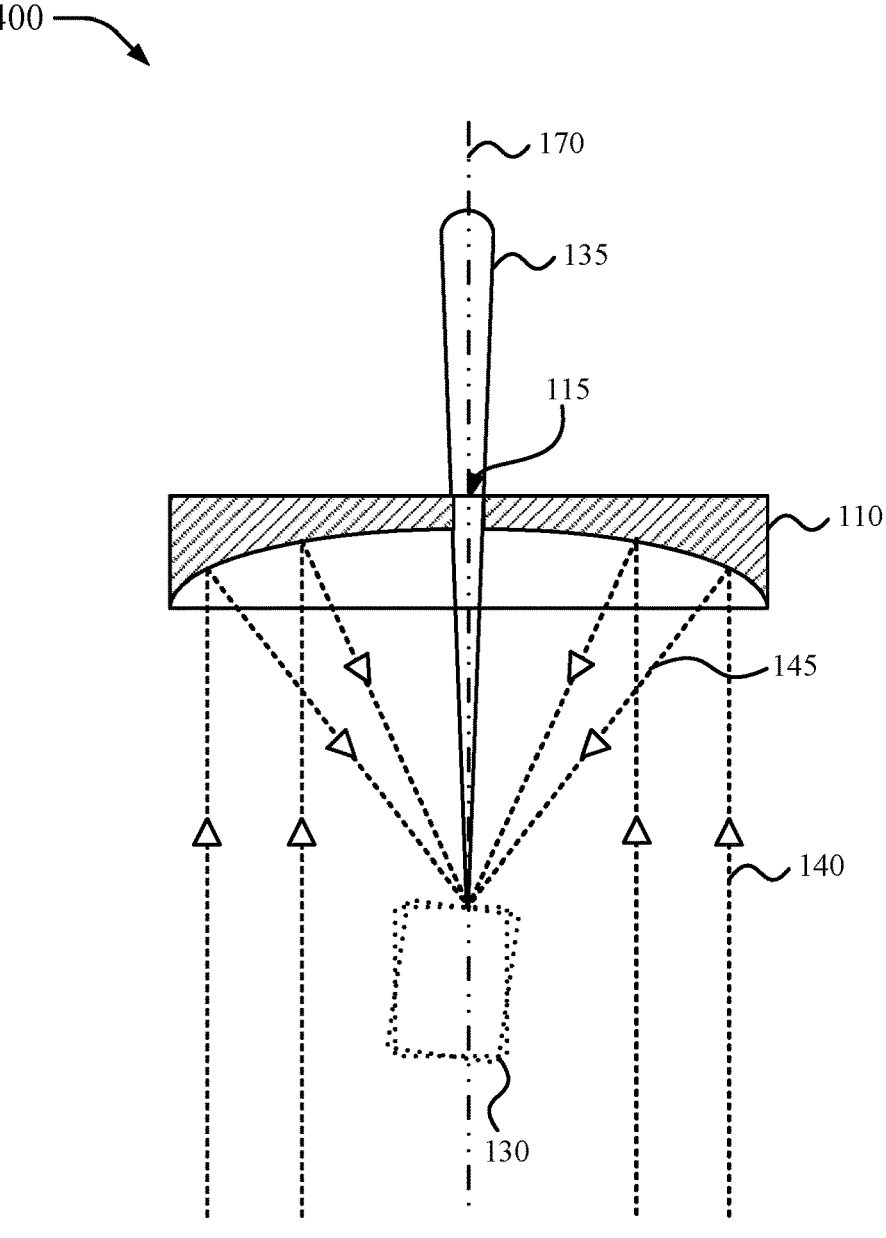
FIG. 4 illustrates a side view of a reflector used to focus an ablation laser beam onto an off-axis atomic source for loading of a trap in accordance with aspects of the disclosure.
Figure 4:
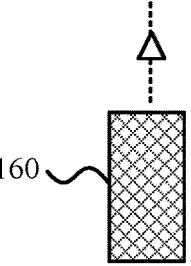

This disclosure also supports the implementation of an angled (or tilted) ablation target (e.g., the atomic source 130). This configuration may be referred to as an off-axis configuration of the ablation target, for example. FIG. 4 shows a diagram 400 in which the atomic source 130 is angled relative to the optical source 160, the hole 115, and a trap (not shown). With the atomic source 130 being angled, it may be possible to achieve a velocity class selectivity from the atomic vapor plume 135. That is, by controlling the amount that the atomic source 130 is angled, a velocity class of atomic species in the atomic vapor plume 135 may be selected to control the way the loading of the trap occurs.

Aspects of the implementations described in FIGS. 1 and 2 (e.g., backside loading, side loading) may be combined with aspects of the implementation described in FIG. 3 (off-axis laser alignment), with aspects of the implementation described in FIG. 4 (angled ablation target), or with aspects from both the implementation described in FIGS. 3 and 4.

Figure 5:
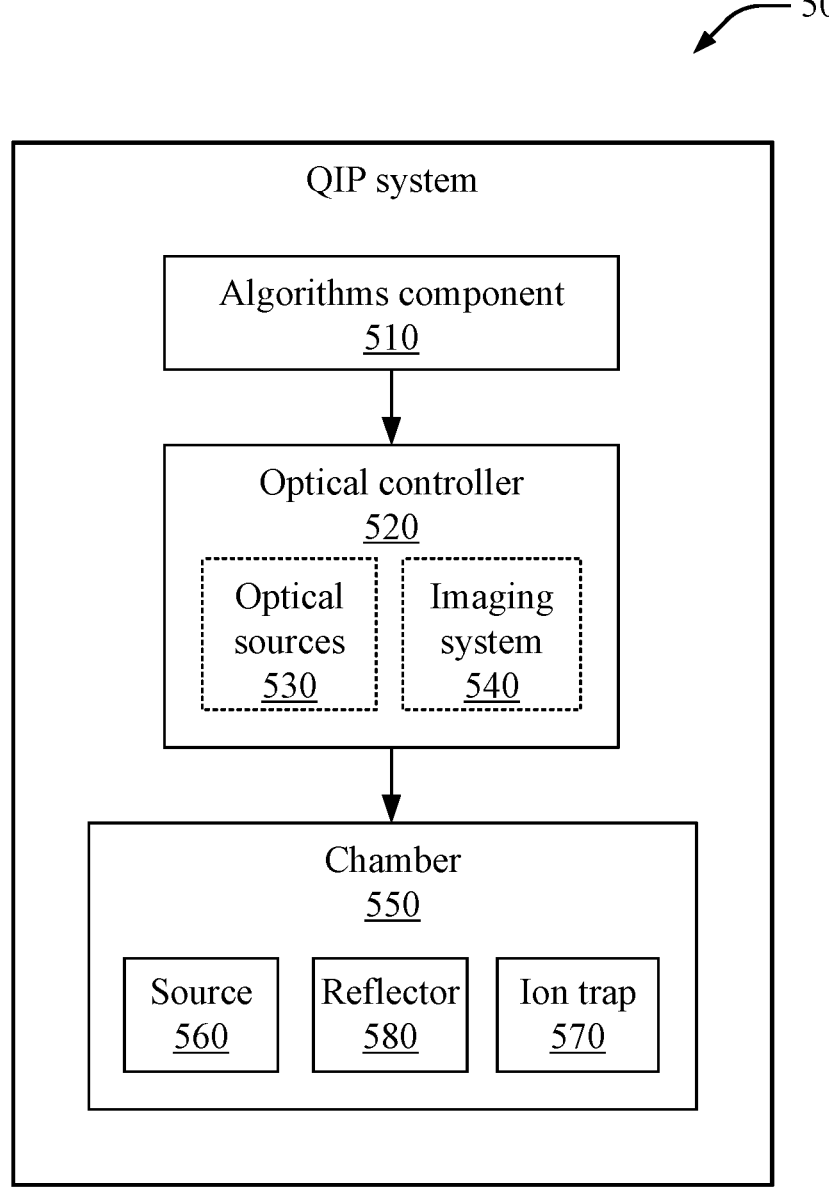
FIG. 5 is a block diagram that illustrates an example of a quantum information processing (QIP) system in accordance with aspects of this disclosure.

FIG. 5 is a block diagram that illustrates an example of a QIP system 500 in accordance with aspects of this disclosure. The QIP system 500 may also be referred to as a quantum computing system, a computer device, a trapped ion system, or the like.

The QIP system 500 can include a source 560 that provides atomic species (e.g., a plume or flux of neutral atoms) to a chamber 550 having an ion trap 570 that traps the atomic species once ionized (e.g., photoionized) by an optical controller 520. In an example, the source 560 may correspond to the source 130 described above in connection with FIGS. 1-4, and the ion trap 570 may correspond to the traps 120a and 120b described above in connection with FIGS. 1 and 2. Also shown is a reflector 580, which may correspond to the reflector 110 described above in connection with FIGS. 1-4.

Optical sources 530 in the optical controller 520 may include one or more laser sources (e.g., sources of optical or laser beams) that can be used for ionization of the atomic species, for control of the atomic ions, and for fluorescence of the atomic ions that can be monitored and tracked by image processing algorithms operating in an imaging system 540 in the optical controller 520. In an aspect, the optical sources 530 may be implemented separately from the optical controller 520. The optical sources 530 may include optical sources used for ablation of the source 560. In an example, the optical source 530 may include optical sources such as the optical source 160, 160a, and 160b described above in connection with FIGS. 1-4.

The imaging system 540 can include a high-resolution imager (e.g., CCD camera) for monitoring the atomic ions while they are being provided to the ion trap 570 or after they have been provided to the ion trap 570. In an aspect, the imaging system 540 can be implemented separately from the optical controller 520, however, the use of fluorescence to detect, identify, and label atomic ions using image processing algorithms may need to be coordinated with the optical controller 520.

The QIP system 500 may also include an algorithms component 510 that may operate with other parts of the QIP system 500 (not shown) to perform quantum algorithms or quantum operations, including a stack or sequence of combinations of single qubit operations and/or multi-qubit operations (e.g., two-qubit operations) as well as extended quantum computations. As such, the algorithms component 510 may provide instructions to various components of the QIP system 500 (e.g., to the optical controller 520) to enable the implementation of the quantum algorithms or quantum operations.

Referring to FIG. 6, a method 600 for ablation loading of a trap within a chamber in a trapped ion system. The functions of the method 600 may be performed by one or more components of a QIP system such as the QIP system 500 and its components (e.g., optical controller 520 and its subcomponents, the chamber 550 and its subcomponents).

At 610, the method 600 includes generating and providing one or more low intensity, high power laser beams (e.g., the ablation laser beams 140, 140a, and 140b).

At 620, the method 600 includes reflecting the one or more laser beams from a reflective front side of a reflector (e.g., front side 150 of the reflector 110) having a hole (e.g., the hole 115) aligned with a loading aperture of the trap (e.g., loading apertures 125 and 127 of the traps 120a and 120b), the reflected one or more laser beams (e.g., the reflected ablation laser beams 145, 145a, and 145b) are focused on a surface of an atomic source (e.g., the atomic source 130) positioned at a focal point of the reflector to produce an atomic plume (e.g., the atomic vapor plume 135).

At 630, the method 600 includes providing the atomic plume once produced through the hole in the reflector and through the loading aperture of the trap for loading the trap.

In connection with FIGS. 1-6 above, the present disclosure generally describes a system for ablation loading of a trap (e.g., a surface electrode trap, a macroscopic trap) that includes a reflector (e.g., a parabolic reflector) having a hole aligned with a loading aperture of the trap, and an atomic source positioned at a focal point of the reflector, where one or more laser beams are reflected from a reflective front side of the reflector and focused on a surface of the atomic source to produce an atomic plume, and the atomic plume once produced passes through the hole in the reflector and through a loading aperture of the trap for loading the trap. The atomic plume is produced by ablation at the surface of the atomic source.

In an aspect of this system, the one or more laser beams may have a first intensity when provided to the reflector and may have a second intensity higher than the first intensity when focused on the surface of the atomic source.

In another aspect of this system, the hole may be positioned at the center of the reflector and extend through the entire thickness of the reflector. In yet another aspect of this system, the hole may be positioned off-center and extend through the entire thickness of the reflector.

In another aspect of this system, the hole in the reflector, the atomic source, and the trap are aligned to the same axis.

In another aspect of this system, the atomic source is positioned to block the one or more laser beams from passing through the hole in the reflector.

In another aspect of this system, a back side of the reflector is configured to face a back side of the trap having the loading aperture for backside loading of the trap using the atomic plume that passes first through the hole and then through the loading aperture.

In another aspect of this system, a back side of the reflector is configured to face a side of the trap having the loading aperture for side loading of the trap using the atomic plume that passes first through the hole and then through the loading aperture.

In another aspect of this system, the system further includes one or more optical sources configured to respectively generate and provide the one or more laser beams.

In another aspect of this system, the hole in the reflector, the atomic source, and the trap are aligned in a same axis, and the system further includes one or more optical sources configured to respectively generate and provide the one or more laser beams, where the one or more optical sources are offset from the axis such that the one or more laser beams are focused by the reflector at different ablation spots on the surface of the atomic source to produce an off-axis laser alignment. Each of the one or more optical sources is configured to provide its respective laser beam to the reflector at a different angle.

In another aspect of this system, the hole in the reflector and the trap are aligned in the same axis, and the atomic source is angled from the axis to provide an angled ablation target that enables velocity class selectivity from the atomic plume.

In another aspect of this system, the atomic source is a source of a single species of atoms. For example, the atomic source is a source of Ytterbium atoms.

In another aspect of this system, the reflector, the atomic source, and the trap are inside a vacuum chamber.

In another aspect of this system, the system is part of a quantum information processing system.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A system for loading of an ion trap, the system comprising:
   a reflector having opposing first and second surfaces with a hole extending therethrough;
   an optical source configured to generate at least one laser beam towards the first surface of the reflector; and
   an atomic source positioned between the optical source and the reflector,
   wherein the first surface of the reflector is structurally configured to reflect and focus the at least one laser beam onto a surface of the atomic source to generate an atomic plume in response thereto that is directed through the hole extending through the reflector.

2. The system of claim 1, wherein the hole in the reflector is aligned with a loading aperture of the ion trap.

3. The system of claim 2, wherein the atomic plume generated by the atomic source is directed through the loading aperture of the ion trap.

4. The system of claim 1, wherein the first surface of the reflector has a parabolic shape facing the optical source.

5. The system of claim 1, wherein the first surface of the reflector is configured to increase an intensity of the at least one laser beam when the at least one laser beam is reflected and focused onto the surface of the atomic source.

6. The system of claim 1, wherein the hole is positioned at a center of the reflector and extends through an entire thickness of the reflector.

7. The system of claim 1, wherein the hole in the reflector, the atomic source, and a loading aperture of the ion trap are aligned to an axis.

8. The system of claim 7, wherein the optical source comprises a plurality of optical sources configured to respectively generate and provide a plurality of laser beams, including the at least one laser beam, the plurality of optical sources being offset from the axis such that the plurality of laser beams are focused by the first surface of the reflector at different ablation spots on the surface of the atomic source to produce an off-axis laser alignment.

9. The system of claim 8, wherein each of the plurality of optical sources is configured to provide a respective laser beam of the plurality of laser beams to the reflector at a different angle.

10. The system of claim 1, wherein the atomic source is positioned to block the at least one laser beam generated by the optical source from passing through the hole in the reflector.

11. The system of claim 1, wherein the second surface of the reflector is configured to face the ion trap, the ion trap having a loading aperture for loading of the trap via directing the atomic plume to pass first through the hole, and then through the loading aperture.

12. The system of claim 1, wherein the ion trap is inside a chamber and the optical source is outside the chamber.

13. The system of claim 1, wherein the hole in the reflector and the ion trap are aligned to a same axis, and the atomic source is angled to the axis of the reflector and the ion trap so as to provide an angled ablation target that enables velocity class selectivity from the atomic plume.

14. The system of claim 1, wherein the atomic source is a source of a single species of atoms.

15. The system of claim 14, wherein the atomic source is a source of Ytterbium atoms.

16. A quantum information processing system, comprising:
   a vacuum chamber;
   an ion trap including a loading aperture;
   one or more laser sources configured to control a plurality of ions in the ion trap;
   an optical controller configured to operate the one or more laser sources to perform quantum processing;
   a reflector having opposing first and second surfaces with a hole extending therethrough, the hole being aligned to the loading aperture of the ion trap;
   an optical source configured to generate a plurality of laser beams towards the first surface of the reflector; and
   an atomic source positioned between the optical source and the reflector,
   wherein the first surface of the reflector is structurally configured to reflect and focus the plurality of laser beams onto a surface of the atomic source to generate an atomic plume in response thereto that is directed through the hole extending through the reflector and into the ion trap via the loading aperture.

17. The system of claim 16, wherein the first surface of the reflector has a parabolic shape facing the optical source.

18. The system of claim 16,
   wherein the hole in the reflector, the atomic source, and the loading aperture of the ion trap are aligned to an axis, and
   wherein the optical source comprises a plurality of optical sources configured to respectively generate and provide the plurality of laser beams, the plurality of optical sources being offset from the axis such that the plurality of laser beams are focused by the first surface of the reflector at different ablation spots on the surface of the atomic source.

19. The system of claim 16, wherein the atomic source is positioned to block the plurality of laser beams generated by the optical source from passing through the hole in the reflector.

20. The system of claim 16, wherein:
   the vacuum chamber has the ion trap disposed therein,
   the optical source is outside the chamber.

* * * * *